(12) United States Patent
Guo et al.

(10) Patent No.: US 9,053,712 B1
(45) Date of Patent: Jun. 9, 2015

(54) DATA STORAGE DEVICE READING SERVO SECTOR WHILE WRITING DATA SECTOR

(71) Applicant: Western Digital Technologies, Inc., Irvine, CA (US)

(72) Inventors: Guoxiao Guo, Irvine, CA (US); Russ A. Quisenberry, San Jose, CA (US); Wei Guo, Fremont, CA (US); Michael Chang, San Jose, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/271,770

(22) Filed: May 7, 2014

(51) Int. Cl.
  *G11B 21/02* (2006.01)
  *G11B 5/09* (2006.01)
(52) U.S. Cl.
  CPC .......................................... *G11B 5/09* (2013.01)
(58) Field of Classification Search
  CPC ...... G11B 7/131; G11B 7/0902; G11B 19/12; G11B 2007/0006; G11B 2007/0013; G11B 7/24
  USPC ................... 369/44.37, 93, 94, 53.22, 44, 37; 360/75, 50, 21, 67, 68, 72.1, 77.05, 360/77.01, 31, 53, 62
  See application file for complete search history.

(56) References Cited

U.S. PATENT DOCUMENTS

| | | | |
|---|---|---|---|
| 5,283,775 A | 2/1994 | Finkelstein et al. | |
| 5,526,202 A | 6/1996 | Blagaila et al. | |
| 5,784,216 A | 7/1998 | Zaharris | |
| 5,784,219 A | 7/1998 | Genheimer | |
| 5,828,630 A * | 10/1998 | Gage et al. | 369/13.54 |
| 5,963,387 A | 10/1999 | Son | |
| 6,009,549 A | 12/1999 | Bliss et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |

(Continued)

OTHER PUBLICATIONS

Guoxiao Guo, et al., U.S. Appl. No. 13/418,966, filed Mar. 13, 2012, 21 pages.

(Continued)

*Primary Examiner* — Nabil Hindi

(57) ABSTRACT

A data storage device is disclosed comprising a disk surface comprising a plurality of tracks, wherein each track comprises a plurality of data sectors and a plurality of servo sectors. The data storage device further comprises a head actuated over the disk surface, the head comprising at least one read element and at least one write element. Control circuitry is configured to use the head to write to a first data sector on the disk surface while simultaneously reading from a first servo sector on the disk surface.

26 Claims, 6 Drawing Sheets

(56) References Cited

U.S. PATENT DOCUMENTS

| | | |
|---|---|---|
| 6,204,988 B1 | 3/2001 | Codilian et al. |
| 6,243,223 B1 | 6/2001 | Elliott et al. |
| 6,265,868 B1 | 7/2001 | Richter |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,407,544 B1 * | 6/2002 | Watanabe .......... 324/210 |
| 6,456,460 B1 | 9/2002 | Connolly et al. |
| 6,462,896 B1 | 10/2002 | Codilian et al. |
| 6,469,853 B1 | 10/2002 | Satoh |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,680,609 B1 | 1/2004 | Fang et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,865,042 B2 | 3/2005 | Dunn et al. |
| 6,867,944 B1 | 3/2005 | Ryan |
| 6,876,508 B1 | 4/2005 | Patton, III et al. |
| 6,882,486 B1 | 4/2005 | Kupferman |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,950,259 B2 | 9/2005 | Osafune |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,992,854 B1 | 1/2006 | Gostling |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,465 B1 | 5/2006 | Kupferman |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,057,836 B1 | 6/2006 | Kupferman |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,577 B1 | 8/2006 | Codilian et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,119,537 B2 | 10/2006 | Che et al. |
| 7,126,781 B1 | 10/2006 | Bennett |
| 7,133,233 B1 | 11/2006 | Ray et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,324,416 B2 * | 1/2008 | Gotoh et al. .......... 369/47.32 |
| 7,330,019 B1 | 2/2008 | Bennett |

(56) References Cited

U.S. PATENT DOCUMENTS

| | | |
|---|---|---|
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,372,650 B1 | 5/2008 | Kupferman |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,489,468 B2 | 2/2009 | Ohinata et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,529,050 B2 | 5/2009 | Shen et al. |
| 7,529,320 B2 | 5/2009 | Byrne et al. |
| 7,542,225 B1 | 6/2009 | Ding et al. |
| 7,548,392 B1 | 6/2009 | Desai et al. |
| 7,551,379 B2 | 6/2009 | Yu et al. |
| 7,551,390 B1 | 6/2009 | Wang et al. |
| 7,558,016 B1 | 7/2009 | Le et al. |
| 7,570,446 B2 | 8/2009 | Kitamura et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,724,464 B2 | 5/2010 | Kisaka et al. |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,907,361 B2 | 3/2011 | Deng et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,982,989 B1 | 7/2011 | Shi et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,553,364 B1 | 10/2013 | Schreiber et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,649,250 B2 * | 2/2014 | Hirata et al. ............... 369/275.1 |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,711,506 B1 | 4/2014 | Giovenzana et al. |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |

(56) References Cited

U.S. PATENT DOCUMENTS

| | | |
|---|---|---|
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 2004/0243455 A1 | 12/2004 | Smith |
| 2005/0243455 A1 | 11/2005 | Annampedu |
| 2010/0035085 A1 | 2/2010 | Jung et al. |
| 2010/0123962 A1 | 5/2010 | O'Brien et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0250447 A1 | 9/2013 | Erden |

OTHER PUBLICATIONS

Guoxiao Guo, et al., U.S. Appl. No. 13/614,894, filed Sep. 13, 2012, 26 pages.

Guoxiao Guo, et al., U.S. Appl. No. 13/797,953, filed Mar. 12, 2013, 14 pages.

* cited by examiner

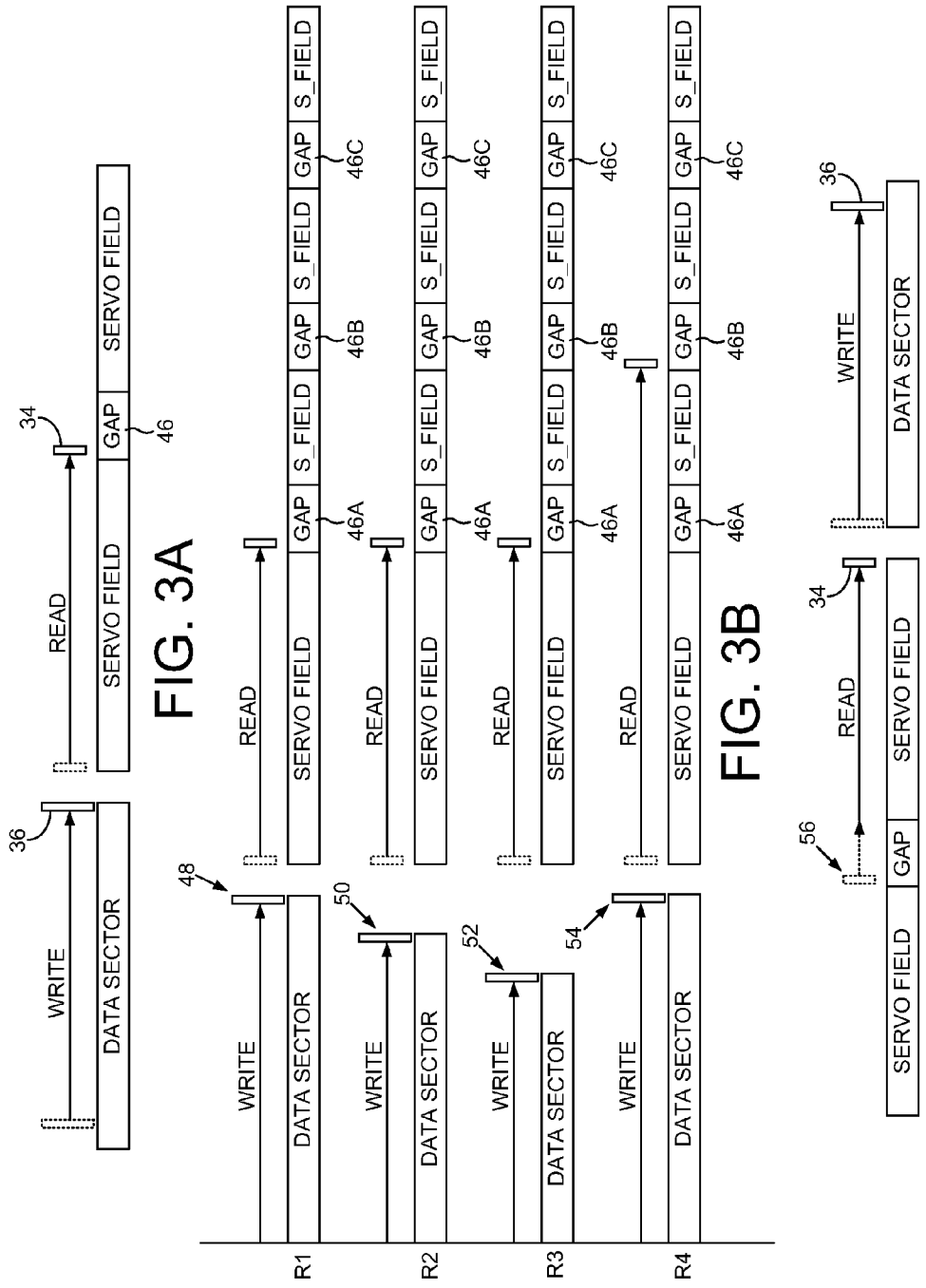

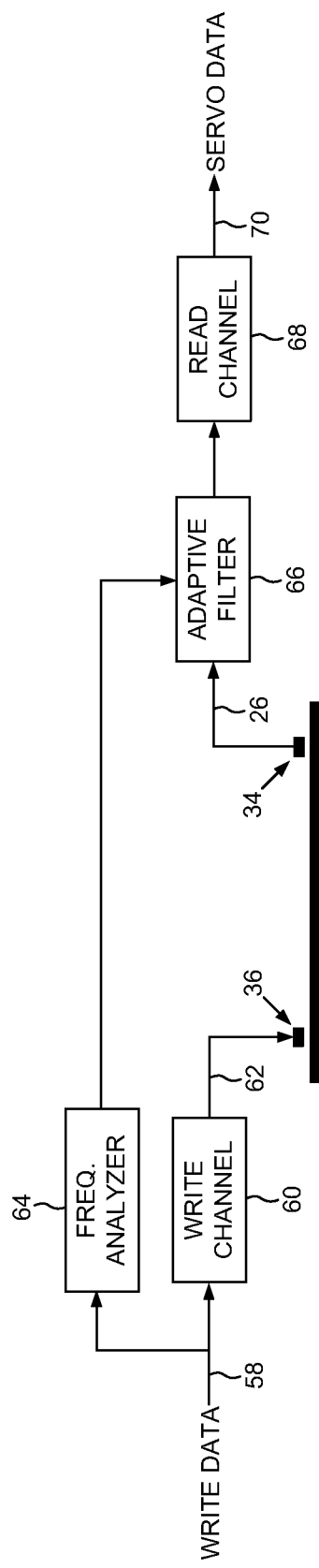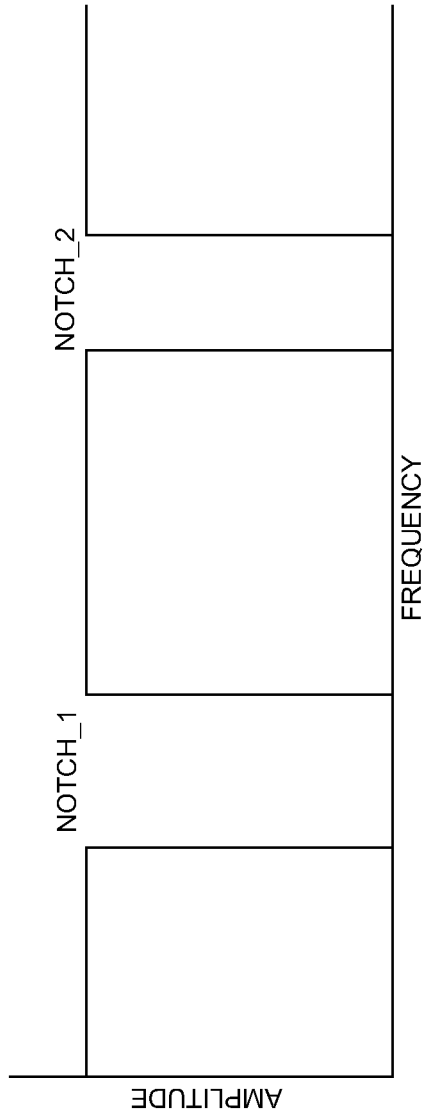

US 9,053,712 B1

DATA STORAGE DEVICE READING SERVO SECTOR WHILE WRITING DATA SECTOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo data 12 and servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PEs.

BRIEF DESCRIPTION OF THE DRAWINGS

FIG. 3A shows an embodiment wherein writing to the first data sector stops when the read element reaches a gap field in the first servo sector to compensate for a transient in a read signal emanating from the read element when the control circuitry stops writing to the first data sector.

FIG. 3B shows an embodiment wherein the servo sector may comprise multiple gaps to compensate for a varying reader/writer gap as the head changes radial locations.

FIG. 4 shows an embodiment wherein writing to the first data sector starts when the read element reaches a gap field in the first servo sector to compensate for a transient in a read signal emanating from the read element when the control circuitry starts writing to the first data sector.

FIG. 5A shows control circuitry according to an embodiment wherein a read signal emanating from the read element when reading the first servo sector is filtered based on a frequency of data simultaneously written to the first data sector.

FIG. 5B shows an embodiment wherein the filter comprises a plurality of notch filters which attenuate frequency bands in the read signal corresponding to the written data so as to attenuate crosstalk interference in the read signal from the write signal.

DETAILED DESCRIPTION

Figure 2A:
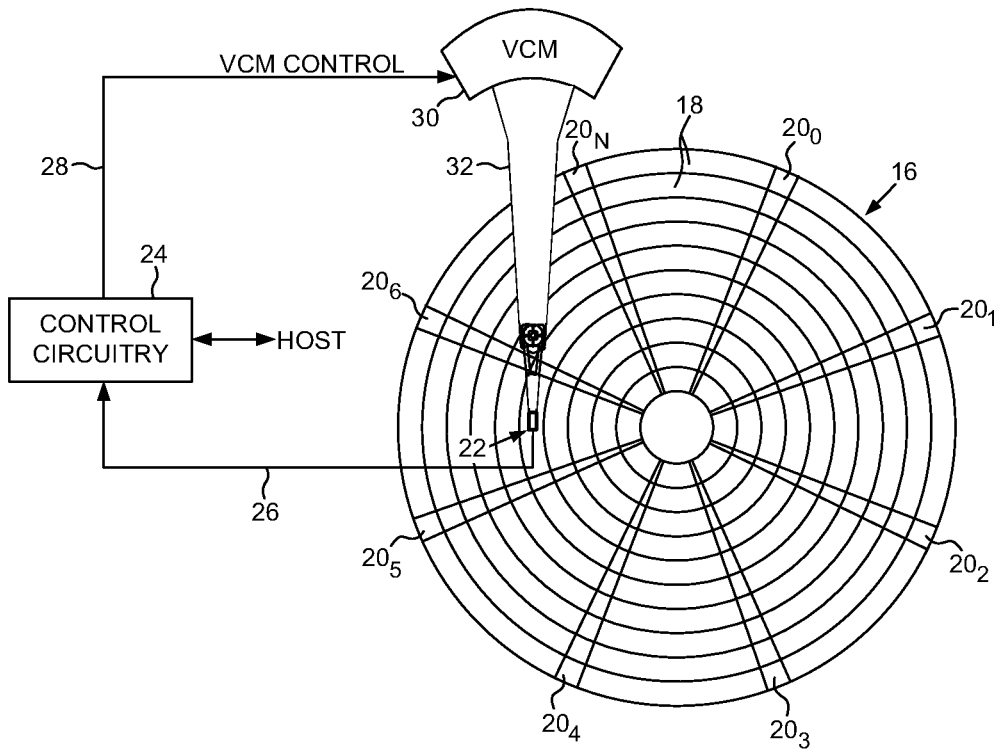
FIG. 2A shows a data storage device in the form of a disk drive according to an embodiment comprising a head actuated over a disk surface, wherein the head comprises at least one read element and write element.

FIG. 2A shows a data storage device in the form of a disk drive according to an embodiment comprising a disk surface 16 comprising a plurality of tracks 18, wherein each track comprises a plurality of data sectors and a plurality of servo sectors $20_0$-$20_N$. The data storage device further comprises a head 22 actuated over the disk surface 16, the head 22 comprising at least one read element and at least one write element. Control circuitry 24 is configured to use the head 22 to write to a first data sector on the disk surface 16 while simultaneously reading from a first servo sector on the disk surface 16.

Figure 1:
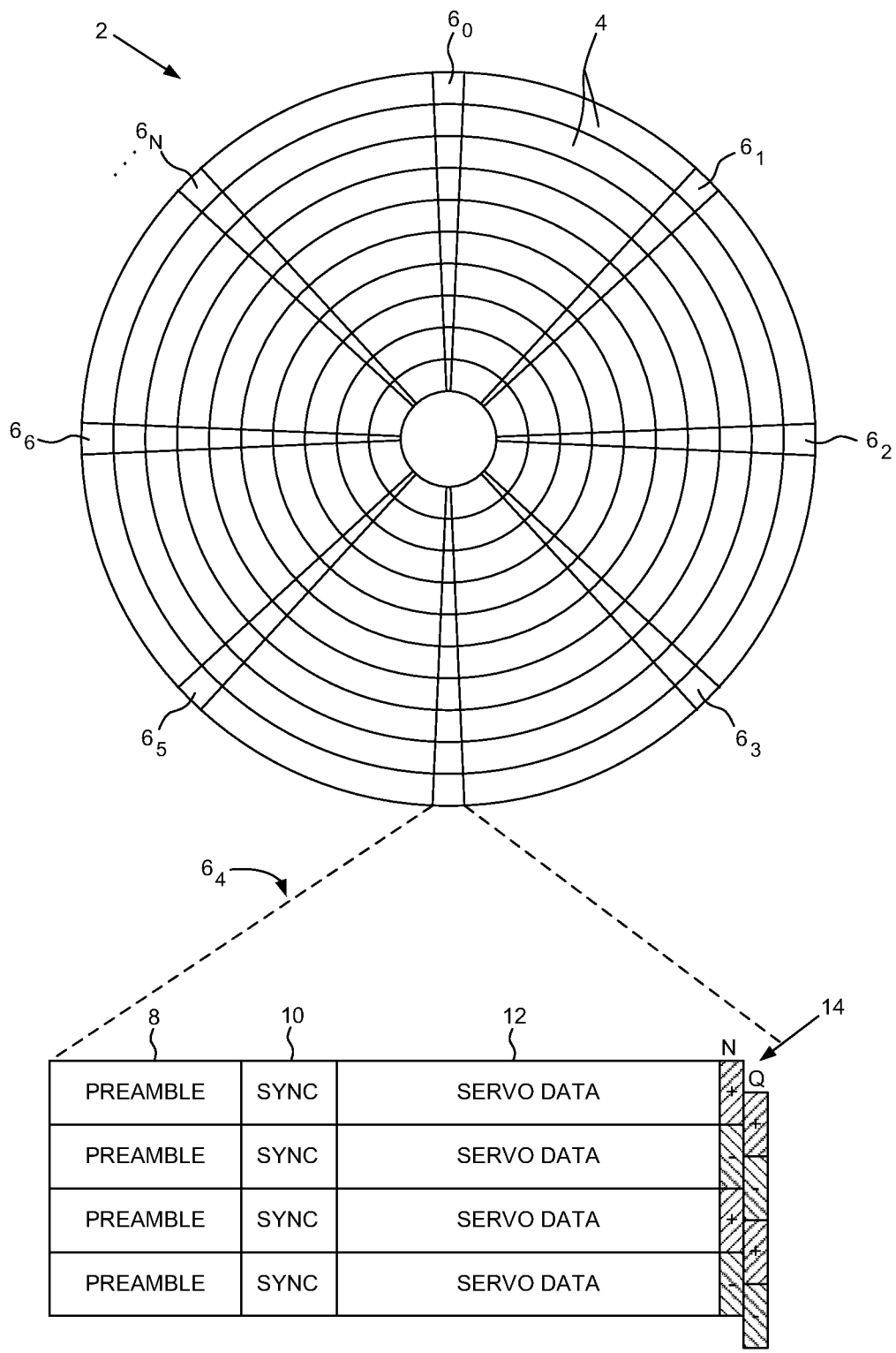
FIG. 1 shows a prior art disk format comprising a plurality of servo tracks defined by servo sectors.

In the embodiment of FIG. 2A, the data tracks that comprise the data sectors may be defined relative to the servo tracks at the same or different radial density. The control circuitry 24 processes a read signal 26 emanating from the head 22 to demodulate the servo sectors $20_0$-$20_N$ and generate a position error signal (PES) representing an error between the actual position of the head and a target position relative to a target track. The control circuitry 24 filters the PES using a suitable compensation filter to generate a control signal 28 applied to a voice coil motor (VCM) 30 which rotates an actuator arm 32 about a pivot in order to actuate the head 22 radially over the disk surface 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 2B:
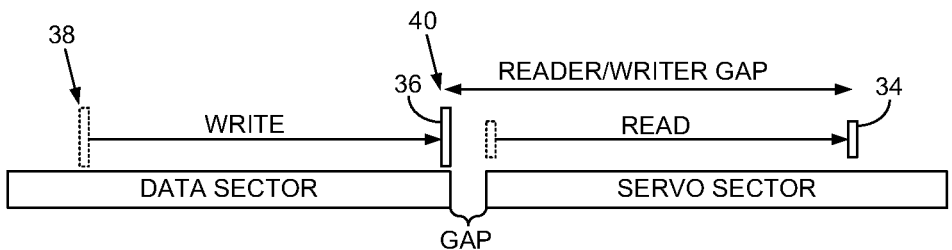
FIG. 2B shows an embodiment wherein the head is used to write to a first data sector on the disk surface while simultaneously reading from a first servo sector on the disk surface, wherein the first data sector precedes the first servo sector.

FIG. 2B shows an embodiment wherein the head 22 comprises a read element 34 that leads a write element 36 meaning that the read element 34 will reach a servo sector before the write element 36. If a write operation were stopped when the read element 34 reached the beginning of a servo sector (i.e., when the write element 36 reaches position 38 in FIG. 2B), there would be a large gap between the data sector and the following servo sector corresponding to the gap between the read element 34 and the write element 36 (the reader/writer gap). This gap between the data sectors and servo sectors reduces the format efficiency of the disk surface 16. Accordingly, in one embodiment in order to increase the format efficiency of the disk surface 16, the write operation is allowed to continue simultaneously while the read element 34 reads at least part of the following servo sector. In the example of FIG. 2B, the write operation continues until the write element 36 reaches position 40, thereby reducing the gap between the data sector and the following servo sector.

Figure 2C:
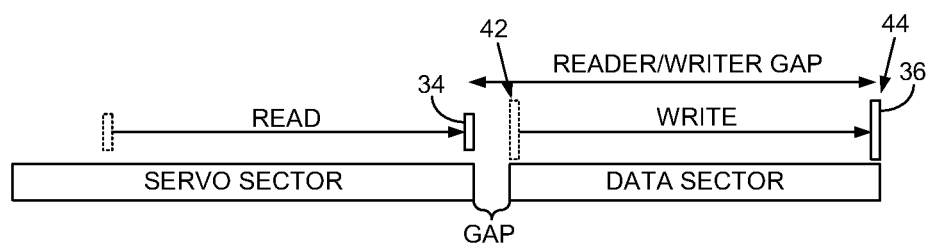
FIG. 2C shows an embodiment wherein the head is used to write to a first data sector on the disk surface while simultaneously reading from a first servo sector on the disk surface, wherein the first data sector follows the first servo sector.

FIG. 2C shows an embodiment wherein the write element 36 leads the read element 34 meaning that the write element 36 will reach the end of a servo sector before the read element 34. If a write operation were delayed until the read element 34 passed the end of the servo sector, there would be a large gap between the servo sector and the following data sector corresponding to the gap between the read element 34 and the write element 36 (the reader/writer gap). Accordingly, in this embodiment in order to increase the format efficiency of the disk surface 16, the write operation starts sooner while the read element 34 simultaneously reads at least part of the previous servo sector. In the example of FIG. 2C, the write operation starts a short time after the write element 36 passes over the end of the servo sector (at position 42 as compared to position 44), thereby reducing the gap between the servo sector and the following data sector.

Any suitable read element 34 may be employed (e.g., a magnetoresistive element), and any suitable write element 36 may be employed (e.g., an inductive write coil). In one embodiment, there may be a transient induced into the read signal when the write current applied to the write element 36 starts at the beginning of a write operation, and/or when the write current stops at the end of a write operation. Accordingly, in one embodiment the servo sector comprises at least one gap field that the read element 34 may be positioned over at the beginning or end of a write operation so that a transient induced into the read signal does not corrupt any servo data needed to accurately demodulate the servo sector. FIG. 3A shows an example of this embodiment wherein a servo sector may comprise a gap field 46 that may not store any servo data, or may store servo data not necessary during a write operation (i.e., during a tracking operation). For example, the gap field 46 may comprise the high order bits of a track address or a servo sector ID (wedge ID) which may be needed when seeking the head 22 over the disk surface 16 but not while tracking the centerline of a data track during a write operation. The gap field 46 may be defined at any suitable location within a servo sector, such as embedded in the servo preamble, between the servo preamble and sync mark, between the sync mark and the track address, embedded in the track address, between the track address and the servo bursts, etc. In one embodiment, the read channel may remain enabled while reading the gap field of the servo sector (with the resulting data discarded), or the read channel may be disabled while reading the gap field so that the transient in the read signal does not corrupt operation of the gain control loop and/or the timing recovery loop.

In one embodiment, the reader/writer gap relative to the linear density of the servo data varies based on the radial location of the head 22, for example, the reader/writer gap may increase toward the inner diameter (ID) of the disk surface 16 due to the increase in a linear bit density of the servo data. FIG. 3B shows an embodiment wherein a servo sector may comprise multiple gap fields which may be used to compensate for a varying reader/writer gap. When the head 22 is at radial location R1, the write operation preceding the servo sector may stop at location 48 when the read element is over gap 46A. When the head 22 is at radial location R2, the write operation preceding the servo sector may stop at location 50 which is sooner than location 48 due to the increase in the reader/writer gap at radial location R2. Similarly, at radial location R3 the write operation may stop at location 52 which is still sooner than location 50 due to the further increase in the reader/writer gap. Eventually the reader/writer gap increases such that the write operation may stop when the read element is over gap 46B of the servo sector which is illustrated in FIG. 3B when the head 22 reaches radial location R4. Accordingly, when the head 22 reaches radial location R4 the write operation preceding the servo sector may stop at location 54, thereby decreasing the gap between the data sector and the servo sector. In one embodiment, in order to simplify implementation the disk surface 16 may be divided into a number of radial bands or zones, wherein the stopping location for the write operation preceding a servo sector may remain constant within each zone, but vary across the zones. In this embodiment, a zone boundary may be defined at the transition between stopping the write operation when the read element is over different gap fields of the servo sector, such as the transition between radial location R3 and R4 in FIG. 3B.

FIG. 4 shows an embodiment wherein a gap field 46 in the servo sector may be used to start a write operation when the write element 36 leads the read element 34. That is, a write operation following a servo sector may start when the read element 34 reaches the gap field 46 at location 56 within the servo sector, thereby compensating for a transient that may occur in the read signal when the write current is applied to the write element 36 at the start of the write operation. After the transient settles, the read element 34 may be used to read to the end of the servo sector while simultaneously writing to the data sector following the servo sector, thereby reducing the gap between the end of the servo sector and the beginning of the data sector.

In one embodiment, when writing to a data sector while simultaneously reading a servo sector, the frequency of the write data may cause crosstalk interference in the read signal leading to errors in the demodulated servo data. To compensate for this crosstalk interference, in one embodiment the control circuitry 24 is configured to filter the read signal 26 when reading a servo sector based on a frequency of data simultaneously written to a data sector. An example of this embodiment is shown in FIG. 5A wherein write data 58 is applied to a write channel 60 which generates a corresponding write current 62 applied to the write element 36 during a write operation. As the read element 34 approaches a servo sector, block 64 analyzes the frequency spectrum of the upcoming write data (e.g., by computing a discrete Fourier transform), and then configures an adaptive filter 66 based on the detected frequency spectrum. In this manner when the read element 34 begins reading the servo sector, the read signal may be filtered by the adaptive filter 66 (in the analog and/or digital domain) so as to attenuate crosstalk interference due to simultaneously writing to the first data sector. The filtered read signal may then be processed by a suitable read channel 68 to increase the accuracy of the detected servo data 70 (e.g., track address, servo bursts, repeatable runout data, etc.).

FIG. 5B illustrates an embodiment wherein the adaptive filter 66 of FIG. 5A may comprise a plurality of notch filters having a programmable frequency range. The frequency analyzer (block 64 of FIG. 5A) may configure the notch filters so as to attenuate the frequency spectrum of the read signal 26 that overlaps with the frequency spectrum of the data simultaneously written to the data sector. In one embodiment, if there is a significant overlap between the write data frequency and the read data frequency, the control circuitry 24 may configure the read channel to ignore all or part of the servo sector. For example, when there is a significant alignment of the frequency spectrums while the read element 34 is reading part of the servo preamble, the read signal 26 may be ignored for a predetermined interval while freezing the timing recovery and gain control loops. In other embodiment, part or all of a track address may be ignored, and the missing address information filled-in using a suitable state estimator. In yet another embodiment, the PES generated by reading the servo bursts during the tracking operation may be ignored (and optionally replaced with a state estimator PES) for the current servo sector when the write/read frequency spectrums significantly align. For example, in one embodiment the frequency of the servo bursts may be known a priori such that the control circuitry 24 may detect when the frequency spectrum of the write data (as determined by block 64) significantly overlaps with the frequency of a servo burst.

Figure 6A:
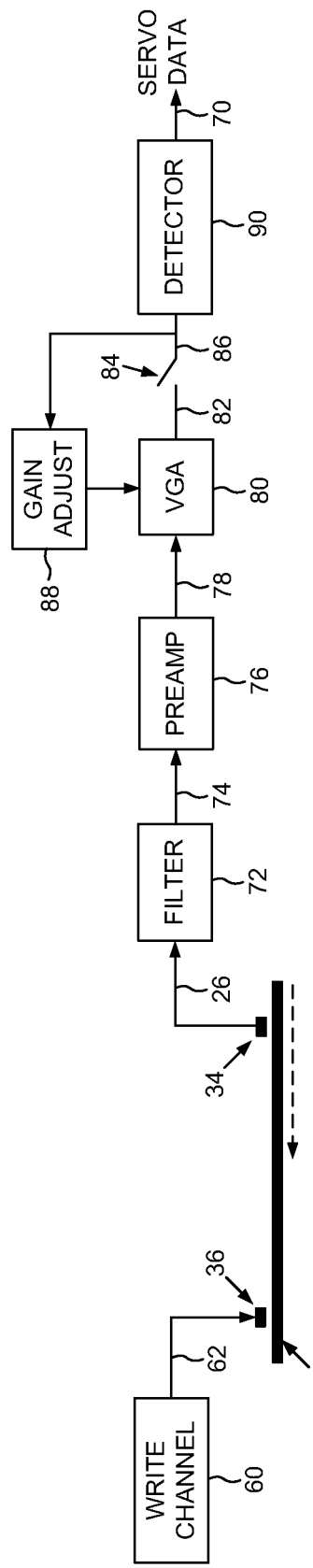
FIG. 6A shows control circuitry according to an embodiment wherein a read signal emanating from the read element when reading the first servo sector is filtered based on a frequency of data recorded in the first servo sector.

FIG. 6A shows control circuitry 24 according to an embodiment comprising a filter 72 configured to filter the read signal 26 emanating from the read element 34 when reading the first servo sector based on a frequency of data recorded in the first servo sector to generate a filtered read signal 74. A preamp 76 amplifies the filtered read signal 74 to generate a preamplified read signal 78. A variable gain amplifier (VGA) 80 amplifies the preamplified read signal 78 to generate an amplified read signal 82. A sampling device 84 (e.g., analog-to-digital converter) samples the amplified read signal 82 to generate signal samples 86, block 88 adjusts a gain of the VGA 80 based on the signal samples 86, and detector 90 detects the data recorded in the first servo sector based on the signal samples 86.

Figure 6B:
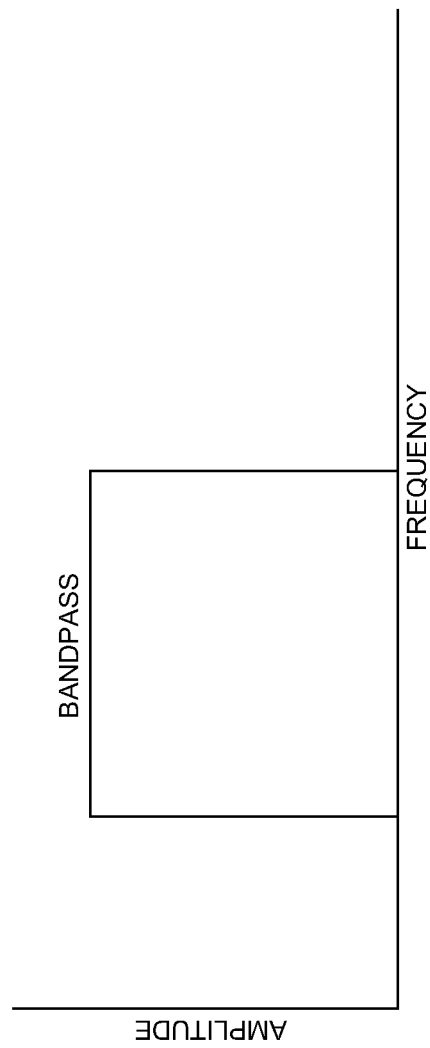
FIG. 6B shows an embodiment wherein the read signal is filtered using a bandpass filter having a frequency range based on the frequency of the data recorded in the first servo sector.

In one embodiment, the filter 72 in FIG. 6A filters the read signal 26 to extract the frequency components of the data recorded in the first servo sector while attenuating crosstalk interference due to simultaneously writing to the first data sector. For example, the filter 72 may implement a bandpass filter as shown in FIG. 6B having a frequency range that corresponds to the frequency range of the data recorded in the first servo sector. In the embodiment of FIG. 6A, the filter 72 filters the read signal 26 so that the crosstalk interference is attenuated before it is amplified by the preamp 76. The filter 72 may be implemented in any suitable manner, such as circuitry that is integrated with the preamp 76, and/or circuitry fabricated as part of a flex circuit coupling the head 22 to the preamp 76, and/or passive circuitry (e.g., capacitors, inductors, etc.) implemented by the transmission lines within the flex circuit, and/or integrated with the head 22, etc.

Figure 7:
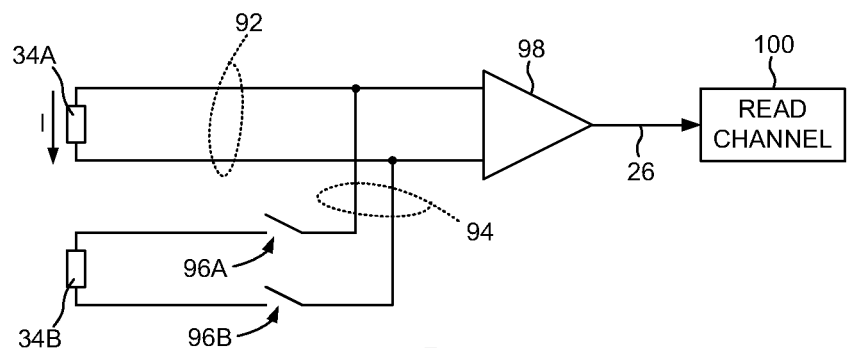
FIG. 7 shows an embodiment wherein the head comprises a first read element for generating a read signal and a second read element for attenuating crosstalk interference in the read signal due to simultaneously writing to the first data sector.

FIG. 7 shows an embodiment wherein the head 22 comprises a first read element 34A and a second read element 34B. When reading the first servo sector and simultaneously writing the first data sector the first read element 34A is configured (e.g., biased by a current) to read the first servo sector to generate a first read signal 92 comprising a data component based on the first servo sector and crosstalk interference due to simultaneously writing to the first data sector. In addition, a second signal 94 is received from the second read element 34B, wherein the second signal 94 comprises crosstalk interference due to simultaneously writing to the first data sector. The first read signal 92 and the second signal 94 are combined (e.g., by closing switches 96A and 96B) to at least partially cancel the crosstalk interference from the first read signal 92.

In one embodiment, the second read element 34B of FIG. 7 may be used to generate a second read signal during a read operation when not writing to the disk (i.e., when not being used to attenuate crosstalk interference). For example, the second read element 34B may be used to implement a two-dimensional magnetic recording (TDMR) algorithm wherein multiple read signals are processed in order to improve the accuracy of data detection when reading data from the disk. When the second read element 34B is used to generate a read signal (e.g., for TDMR), the second read element 34B may be appropriately biased, such as biasing a magnetorestistive (MR) element. When reading data from the first servo sector while simultaneously writing to the first data sector, the control circuitry may disable or reduce the biasing of the second read element 34B so that the second signal 94 shown in FIG. 7 comprises mainly the crosstalk interference and substantially no signal from reading the disk. In the embodiment of FIG. 7, the polarity of the read elements 34A and 34B may be opposite one another such that the wired-or addition of the first read signal 92 and the second signal 94 attenuates the crosstalk interference in the first read signal 92. An amplifier 98 amplifies the wired-or read signal to generate the read signal 26 processed by a suitable read channel 100.

Figure 8:
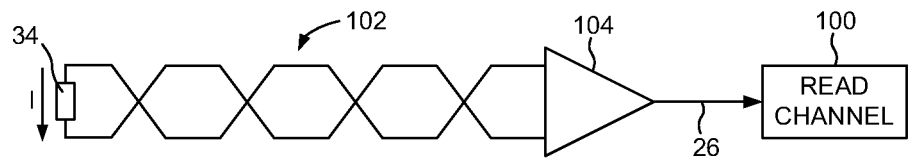
FIG. 8 shows an embodiment wherein a read element of the head is coupled to the control circuitry (e.g., preamp) by a twisted pair transmission line that attenuates crosstalk interference in the read signal due to simultaneously writing to the first data sector.

FIG. 8 shows an embodiment wherein the read element 34 generates a read signal while reading the first servo sector, and the read element 34 is coupled to the control circuitry by a twisted pair transmission line 102 that attenuates crosstalk interference in the read signal due to simultaneously writing to the first data sector. In the embodiment of FIG. 8, the twisted pair transmission line 102 couples the read element 34 to an amplifier 104 which may be implemented within a preamp circuit, or within a flex circuit that couples the amplifier 104 to the preamp circuit.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being configured to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk surface comprising a plurality of tracks, wherein each track comprises a plurality of data sectors and a plurality of servo sectors;
   a head actuated over the disk surface, the head comprising at least one read element and at least one write element; and
   control circuitry configured to:
   use the head to write to a first data sector on the disk surface while simultaneously reading from a first servo sector on the disk surface; and
   measure a reader/writer gap between the read element and the write element.

2. The data storage device as recited in claim 1, wherein the control circuitry is further configured to stop writing to the first data sector based on the measured reader/writer gap.

3. The data storage device as recited in claim 2, wherein the control circuitry is further configured to stop writing to the first data sector based on the measured reader/writer gap and a format of the first servo sector.

4. The data storage device as recited in claim 3, wherein the first servo sector comprises at least one gap field to compensate for a transient in a read signal emanating from the read element when the control circuitry stops writing to the first data sector.

5. The data storage device as recited in claim 1, wherein the control circuitry is further configured to start writing to the first data sector based on the measured reader/writer gap.

6. The data storage device as recited in claim 5, wherein the control circuitry is further configured to start writing to the first data sector based on the measured reader/writer gap and a format of the first servo sector.

7. The data storage device as recited in claim 6, wherein the first servo sector comprises at least one gap field to compensate for a transient in a read signal emanating from the read element when the control circuitry starts writing to the first data sector.

8. The data storage device as recited in claim 1, wherein the control circuitry is further configured to filter a read signal emanating from the read element when reading the first servo sector based on a frequency of data simultaneously written to the first data sector.

9. The data storage device as recited in claim 1, wherein the control circuitry is further configured to:
   filter a read signal emanating from the read element when reading the first servo sector based on a frequency of data recorded in the first servo sector to generate a filtered read signal;
   amplify the filtered read signal using a preamp to generate a preamplified read signal;
   amplify the preamplified read signal using a variable gain amplifier to generate an amplified read signal;
   generate signal samples based on the amplified read signal;
   adjust a gain of the variable gain amplifier based on the signal samples; and
   detect the data recorded in the first servo sector based on the signal samples.

10. The data storage device as recited in claim 1, wherein the head comprises a first read element and a second read element and the control circuitry is further configured to:
    configure the first read element to read the first servo sector to generate a first read signal comprising a data component based on the first servo sector and crosstalk interference due to simultaneously writing to the first data sector;
    receive from the second read element a second signal comprising crosstalk interference due to simultaneously writing to the first data sector; and
    combine the first read signal and the second signal to at least partially cancel the crosstalk interference from the first read signal.

11. The data storage device as recited in claim 1, wherein:
    the read element generates a read signal while reading the first servo sector; and
    the read element is coupled to the control circuitry by a twisted pair transmission line that attenuates crosstalk interference in the read signal due to simultaneously writing to the first data sector.

12. A method of operating a data storage device, the method comprising:
    using a head to write to a first data sector on a disk surface while simultaneously reading from a first servo sector on the disk surface; and
    measuring a reader/writer gap between a read element and a write element of the head.

13. The method as recited in claim 12, further comprising stopping writing to the first data sector based on the measured reader/writer gap.

14. The method as recited in claim 13, further comprising stopping writing to the first data sector based on the measured reader/writer gap and a format of the first servo sector.

15. The method as recited in claim 14, wherein the first servo sector comprises at least one gap field to compensate for a transient in a read signal emanating from a read element of the head when writing to the first data sector stops.

16. The method as recited in claim 12, further comprising starting writing to the first data sector based on the measured reader/writer gap.

17. The method as recited in claim 16, further comprising starting writing to the first data sector based on the measured reader/writer gap and a format of the first servo sector.

18. The method as recited in claim 17, wherein the first servo sector comprises at least one gap field to compensate for a transient in a read signal emanating from a read element of the head when writing to the first data sector starts.

19. The method as recited in claim 12, further comprising filtering a read signal emanating from a read element of the head when reading the first servo sector based on a frequency of data simultaneously written to the first data sector.

20. The method as recited in claim 12, further comprising:
bandpass filtering a read signal emanating from a read element when reading the first servo sector based on a frequency of data recorded in the first servo sector to generate a filtered read signal;
amplifying the filtered read signal using a preamp to generate a preamplified read signal;
amplifying the preamplified read signal using a variable gain amplifier to generate an amplified read signal;
generating signal samples based on the amplified read signal;
adjusting a gain of the variable gain amplifier based on the signal samples; and
detecting the data recorded in the first servo sector based on the signal samples.

21. The method as recited in claim 12, further comprising:
configuring a first read element to read the first servo sector to generate a first read signal comprising a data component based on the first servo sector and crosstalk interference due to simultaneously writing to the first data sector;
receiving from a second read element a second signal comprising crosstalk interference due to simultaneously writing to the first data sector; and
combining the first read signal and the second signal to at least partially cancel the crosstalk interference from the first read signal.

22. The method as recited in claim 12, further comprising:
generating a read signal while reading the first servo sector; and
transmitting the read signal through a twisted pair transmission line that attenuates crosstalk interference in the read signal due to simultaneously writing to the first data sector.

23. A data storage device comprising:
a disk surface comprising a plurality of tracks, wherein each track comprises a plurality of data sectors and a plurality of servo sectors;
a head actuated over the disk surface, the head comprising at least one read element and at least one write element; and
control circuitry configured to:
use the head to write to a first data sector on the disk surface while simultaneously reading from a first servo sector on the disk surface;
filter a read signal emanating from the read element when reading the first servo sector based on a frequency of data recorded in the first servo sector to generate a filtered read signal;
amplify the filtered read signal using a preamp to generate a preamplified read signal;
amplify the preamplified read signal using a variable gain amplifier to generate an amplified read signal;
generate signal samples based on the amplified read signal;
adjust a gain of the variable gain amplifier based on the signal samples; and
detect the data recorded in the first servo sector based on the signal samples.

24. A data storage device comprising:
a disk surface comprising a plurality of tracks, wherein each track comprises a plurality of data sectors and a plurality of servo sectors;
a head actuated over the disk surface, the head comprising at least one a first read element, a second read element, and at least one write element; and
control circuitry configured to:
use the head to write to a first data sector on the disk surface while simultaneously reading from a first servo sector on the disk surface;
configure the first read element to read the first servo sector to generate a first read signal comprising a data component based on the first servo sector and crosstalk interference due to simultaneously writing to the first data sector;
receive from the second read element a second signal comprising crosstalk interference due to simultaneously writing to the first data sector; and
combine the first read signal and the second signal to at least partially cancel the crosstalk interference from the first read signal.

25. A method of operating a data storage device, the method comprising:
using a head to write to a first data sector on a disk surface while simultaneously reading from a first servo sector on the disk surface;
bandpass filtering a read signal emanating from a read element when reading the first servo sector based on a frequency of data recorded in the first servo sector to generate a filtered read signal;
amplifying the filtered read signal using a preamp to generate a preamplified read signal;
amplifying the preamplified read signal using a variable gain amplifier to generate an amplified read signal;
generating signal samples based on the amplified read signal;
adjusting a gain of the variable gain amplifier based on the signal samples; and
detecting the data recorded in the first servo sector based on the signal samples.

26. A method of operating a data storage device, the method comprising:
using a head to write to a first data sector on a disk surface while simultaneously reading from a first servo sector on the disk surface;
configuring a first read element to read the first servo sector to generate a first read signal comprising a data component based on the first servo sector and crosstalk interference due to simultaneously writing to the first data sector;
receiving from a second read element a second signal comprising crosstalk interference due to simultaneously writing to the first data sector; and
combining the first read signal and the second signal to at least partially cancel the crosstalk interference from the first read signal.

* * * * *